United States Patent [19]

Pospich et al.

[11] 4,430,447

[45] Feb. 7, 1984

[54] OPEN-PORE MOLDED ARTICLE BASED ON POLYVINYL ACETALS, AND A PROCESS FOR ITS PREPARATION

[75] Inventors: Günther Pospich, Frankfurt am Main; Wolfgang Zimmermann, Kelkheim, both of Fed. Rep. of Germany

[73] Assignee: Hoechst Aktiengesellschaft, Frankfurt am Main, Fed. Rep. of Germany

[21] Appl. No.: 429,035

[22] Filed: Sep. 30, 1982

[30] Foreign Application Priority Data

Oct. 31, 1981 [DE]  Fed. Rep. of Germany ....... 3143272

[51] Int. Cl.$^3$ ................................................ C08J 9/30
[52] U.S. Cl. ....................................... 521/53; 521/70; 521/82; 521/87; 521/134; 521/141
[58] Field of Search ................ 521/97, 130, 134, 141

[56] References Cited

U.S. PATENT DOCUMENTS

| | | | |
|---|---|---|---|
| 2,609,347 | 9/1952 | Wilson | 54/141 |
| 2,664,367 | 12/1953 | Wilson | 521/55 |
| 4,098,728 | 7/1978 | Rosenblatt | 521/141 |
| 4,246,357 | 1/1981 | Hobes et al. | 521/141 |

*Primary Examiner*—Morton Foelak
*Attorney, Agent, or Firm*—Curtis, Morris & Safford

[57] ABSTRACT

When polyvinyl alcohol and vinyl acetate/ethylene copolymers are acetalized in an acid aqueous medium in the presence of a wetting agent, an open-pore solid foam is formed, if the reaction mixture contains gas bubbles. These gas bubbles are produced, in particular, by stirring in air. The molded articles obtained are porous, and the pores are uniformly distributed. The dried molded article absorbs many times its weight of water. It is employed as a sponge for household use and in industry.

3 Claims, No Drawings

OPEN-PORE MOLDED ARTICLE BASED ON POLYVINYL ACETALS, AND A PROCESS FOR ITS PREPARATION

The invention relates to an open-pore molded article based on polyvinyl acetals and to a process for its preparation by acetalizing vinyl polymers in an acid aqueous medium in the presence of a wetting agent.

The preparation of sponge material having open pores by reacting polyvinyl alcohol with formaldehyde in an aqueous medium has been known for a long time (cf. U.S. Pat. No. 2,609,347). The reaction is carried out between 20° and 60° C. in the presence of an acid catalyst, for example sulfuric acid, and gas bubbles are present in a dispersed state in the reaction mixture. These gas bubbles are produced by beating air into the reaction mass. It is stated that, by additionally employing wetting agents, bubbles are formed in a uniform size; and it is also stated that a better distribution of the bubbles in the mass is achieved thereby. In addition, the wetting agents are stated to stabilize the resulting foam. The apparent specific gravity of the sponges thus obtained is within the range from 0.03 to 0.15, preferably 0.05 to 0.06.

It is also known that an open-pore molded article composed of acetalized polyvinyl alcohol is prepared by acetalizing polyvinyl alcohol in an acid aqueous medium in the presence of a customary wetting agent and in the presence of a quantity of a nucleic acid sufficient to have a foam-stabilizing action (cf. German Offenlegungsschrift No. 2,948,508=U.S. Pat. No. 4,296,210). The starting material used here is a polyvinyl alcohol which has an ester number of 50 to 270 mg of KOH/g, a 4 percent by weight aqueous solution of which has a viscosity of 4 to 40 mPa.s at a temperature of 20° C., and the acetalization is preferably carried out by means of formaldehyde or paraformaldehyde.

The object of the invention is to provide a sponge-like, porous molded article based on polymers containing acetal groups, which has open pores of a uniform size, as far as possible, in as homogeneous as possible a distribution, and has a soft surface which has a good feel.

The invention relates to an open-pore molded article based on polyvinyl acetals, wherein the molded article is composed of a mixture of (a) an acetalized polyvinyl alcohol and (b) an acetalized vinyl acetate/ethylene copolymer. The mixture is preferably a mixture composed of a formalized polyvinyl alcohol and a formalized vinyl acetate/ethylene copolymer.

The invention also relates to a process for the preparation of an open-pore molded article based on polyvinyl acetals by acetalizing vinyl polymers in an acid aqueous medium in the presence of a wetting agent, which comprises (a) preparing a foam from a mixture of an aqueous polyvinyl alcohol solution and an aqueous dispersion of a vinyl acetate/ethylene copolymer and (b) reacting the said polymers jointly with an aliphatic aldehyde.

The starting material used for the preparation of the molded article according to the invention is a mixture of a polyvinyl alcohol and a vinyl acetate/ethylene copolymer. The polyvinyl alcohol (PVAL) is employed in the form of an aqueous solution having a PVAL content of 10 to 50, preferably 15 to 40, percent by weight. The polyvinyl alcohol has an ester number of 50 to 270, preferably 100 to 200, mg of KOH/g. A 4 percent strength by weight aqueous solution of the polyvinyl alcohol has a viscosity of 4 to 50, preferably 10 to 26, mPa.s (determined at a temperature of 20° C. as specified in DIN 53,015).

The polyvinyl alcohol solution is employed in admixture with an aqueous dispersion of a vinyl acetate/ethylene copolymer which contains ethylene units in an amount of 5 to 60, preferably 10 to 30, percent by weight. The solids content of this dispersion is 40 to 60, preferably 45 to 55, percent by weight. The dispersion advantageously contains a protective colloid in an amount of 1 to 15, preferably 2 to 10, percent by weight (relative to the copolymer). Suitable protective colloids are, in particular, polyvinyl alcohol and also polyvinyl pyrrolidone, poly-N-vinylacetamide, copolymers of N-vinyl-N-methylacetamide with acrylic acid esters or with maleic acid esters and cellulose derivatives, such as hydroxyethylcellulose and carboxymethylcellulose. The polyvinyl alcohol solution and the vinyl acetate/ethylene copolymer dispersion are employed in a ratio by weight of 100:5 to 100:150, preferably 100:25 to 100:100.

The process according to the invention is carried out in two stages. First, a foam is prepared from a mixture composed of the polyvinyl alcohol solution and the copolymer dispersion in the presence of a wetting agent, advantageously by stirring in air at a stirring speed of 500 to 2,500, preferably 1,000 to 2,000 r.p.m. In so doing, it is advantageous if the volume of the foam is not more than 50 percent of the final volume of the finished molded article. The wetting agent used is, in particular, an anionic wetting agent, for example an alkali metal salt, preferably a sodium salt, of an alkylsulfonate, arylsulfonate or alkylarylsulfonate or of a corresponding sulfate, phosphate or phosphonate. Examples of suitable substances are sodium laurylsulfate, sodium dodecylbenzenesulfonate and sodium N-methyl-N-oleoyltaurate.

The polymers are then jointly reacted with an aliphatic aldehyde which is a monoaldehyde or a dialdehyde having in each case 1 to 4 carbon atoms. It is preferable to use formaldehyde or formaldehyde donors, such as paraformaldehyde, so that the acetalization is in this case a formalization. The aldehyde, preferably in the form of an aqueous solution, is mixed with the foam obtained in the first stage of the process. The acetalization is carried out in an acid aqueous medium which is obtained by using a strong mineral acid, preferably sulfuric acid. The acid is preferably used in the form of an aqueous solution having an acid content of 30 to 80, preferably 35 to 65, percent by weight. The reaction mixture is kept at a temperature not higher than 40° C. during the acetalization. After the aldehyde has been added, the mixture is allowed to stand undisturbed in a closed mold at a temperature of 65° to 100° C., preferably 70° to 90° C. The reaction time is 2 to 4 hours—depending on the quantity of the reaction mixture. The porous molded article, which has been obtained without shrinkage, is then washed thoroughly with water and dried to a constant weight, preferably at a temperature of 70° to 100° C.

The molded article according to the invention has open pores and a soft, velvety surface of good feel. Its water absorption capacity is 1,500 to 2,000 percent by weight. (For comparison: natural sponge absorbs less than 1,000 percent by weight of water). The molded article is suitable for use as a sponge in industry and for the household, for example as a car sponge or a bath sponge.

The Examples which follow illustrate the invention in greater detail. Percentages relate to weight.

EXAMPLE 1

250 g of a 20 percent strength aqueous solution of a polyvinyl alcohol having an ester number of 140 mg of KOH/g, a 4 percent strength aqueous solution of which had a viscosity of 18 mPa.s, were initially taken in a beaker. 100 g of an aqueous dispersion of a vinyl acetate/ethylene copolymer containing 10% of ethylene were first added to this solution, while stirring with a high-speed stirrer at 500 r.p.m., followed by 70 g of a 4 percent strength aqueous solution of sodium N-methyl-N-oleoyltaurate. The copolymer dispersion had a solids content of 50% and contained 8% of polyvinyl alcohol as a protective colloid. The resulting mixture was then foamed by stirring in air at a stirring speed of 2,000 r.p.m. to a volume of 0.5 l, and a mixture of 25 g of paraformaldehyde and 90 g of a 60 percent strength sulfuric acid solution were added to this foam, the temperature of the foam mass being kept at about 35° C. As soon as the foam mass had a cream-like consistency, it was poured into an acid-resistant mold, which was then closed by means of a lid. The mold was allowed to stand undisturbed for 4 hours at a temperature of 70° C. The resulting sponge was then thoroughly washed with water and dried at a temperature of 80° C. The sponge had intercommunicating pores which had diameters of 0.5 to 1 mm and which were uniformly distributed; it was elastic and soft and absorbed 12 times its dry weight of water.

EXAMPLE 2

Example 1 was repeated using the following components:
250 g of polyvinyl alcohol solution (corresponding to Example 1),
50 g of an aqueous dispersion of a vinyl acetate/ethylene copolymer containing 20% of ethylene (solids content: 50%),
60 g of a sodium N-methyl-N-oleoyltaurate solution (corresponding to Example 1),
25 g of paraformaldehyde and
90 g of 60 percent strength sulfuric acid.

The dried sponge had intercommunicating pores which had diameters of 1 to 2 mm and which were uniformly distributed; it was soft, elastic and markedly rubberlike and absorbed 15 times its dry weight of water.

EXAMPLE 3

Example 1 was repeated using the following components:
250 g of polyvinyl alcohol solution (corresponding to Example 1),
25 g of an aqueous dispersion of a vinyl acetate/ethylene copolymer containing 25% of ethylene (solids content: 50%),
60 g of a sodium N-methyl-N-oleoyltaurate solution (corresponding to Example 1),
20 g of paraformaldehyde and
90 g of 60 percent strength sulfuric acid.

The dried sponge had intercommunicating pores which had diameters of 1 to 5 mm and which were uniformly distributed; it was soft and elastic and absorbed 18 times its dry weight of water.

We claim:

1. A method for making an open-pored molded article comprising polyvinyl acetal, which method comprises
   (A) forming a foam by stirring air into a mixture of
      (i) an aqueous solution containing 10 to 50 percent by weight of polyvinyl alcohol,
      (ii) an aqueous dispersion containing 40 to 60 percent by weight of a copolymer of vinyl acetate and ethylene, and
      (iii) a wetting agent, the ratio by weight of solution (i) to dispersion (ii) being from 100:5 to 100:150,
   (B) acetalyzing the polymers in the foamed mixture so produced by mixing therewith an aliphatic aldehyde having one to four carbon atoms, in the presence of an acid, and
   (C) permitting the mixture to stand in a closed mold at a temperature from 65° C. to 100° C.

2. The process as claimed in claim 1, wherein the aliphatic aldehyde used is formaldehyde or a formaldehyde donor.

3. The process as claimed in claim 1, wherein the reaction is carried out at a temperature of 50° to 100° C.

* * * * *